Jan. 21, 1941.  L. L. STEWART  2,229,145
LIGHT FIXTURE
Filed Oct. 30, 1937  2 Sheets-Sheet 1
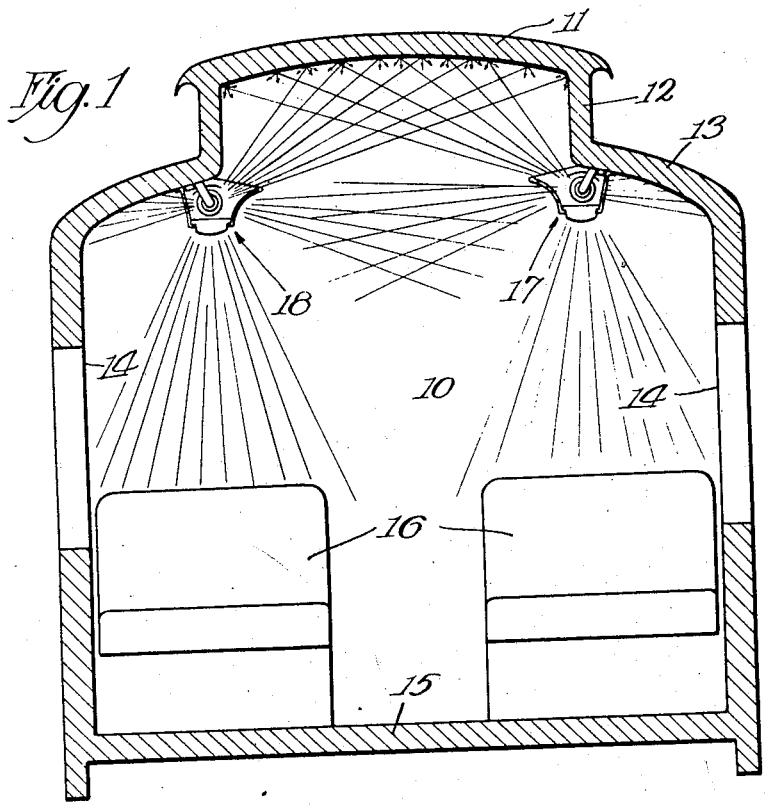
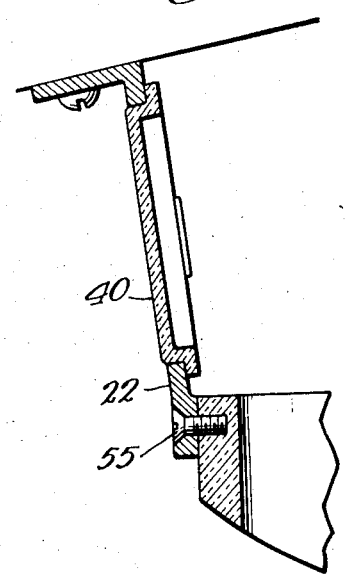
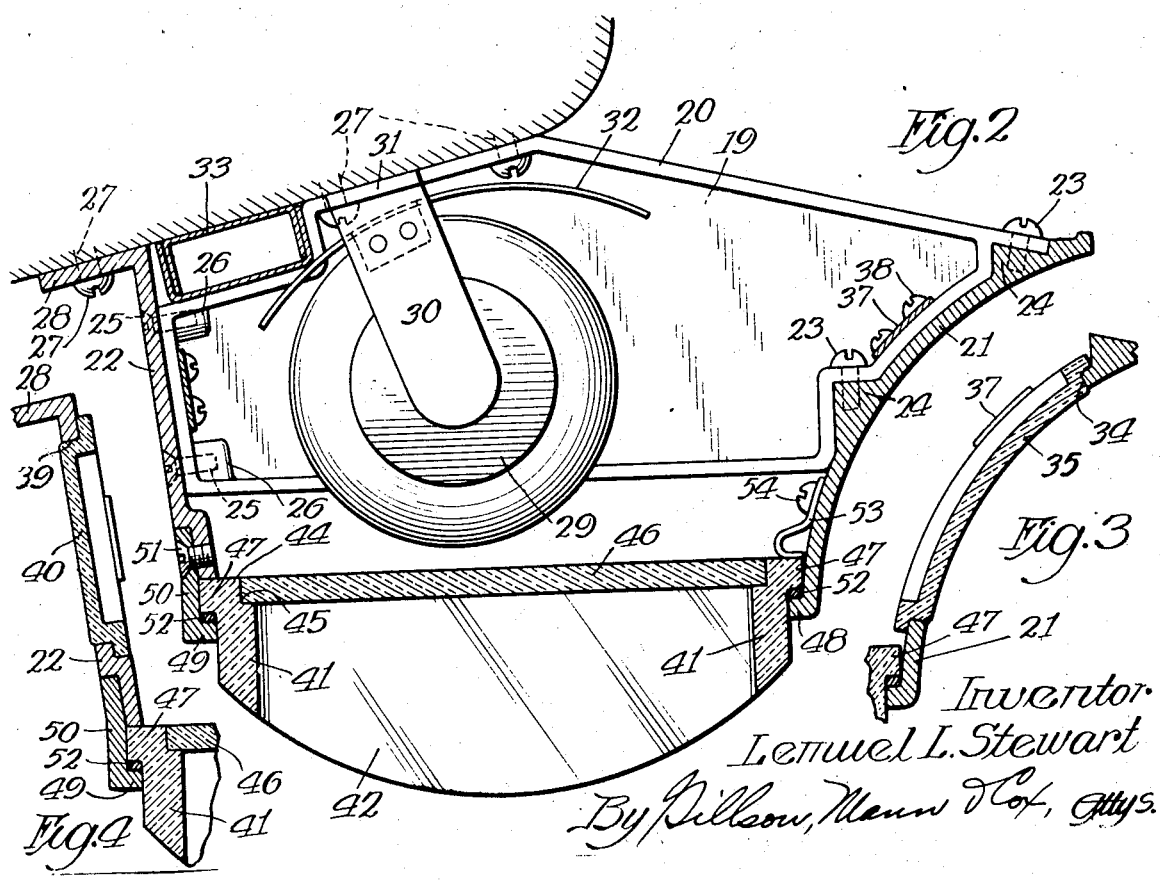
Inventor
Lemuel L. Stewart
By Dillson, Mann & Cox, Attys.

Jan. 21, 1941.  L. L. STEWART  2,229,145
LIGHT FIXTURE
Filed Oct. 30, 1937  2 Sheets-Sheet 2
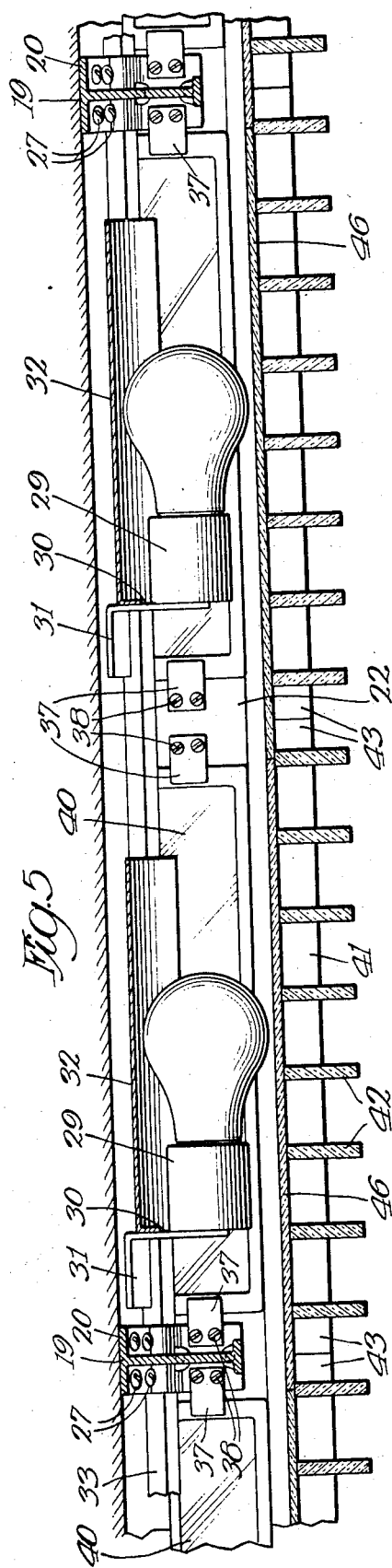
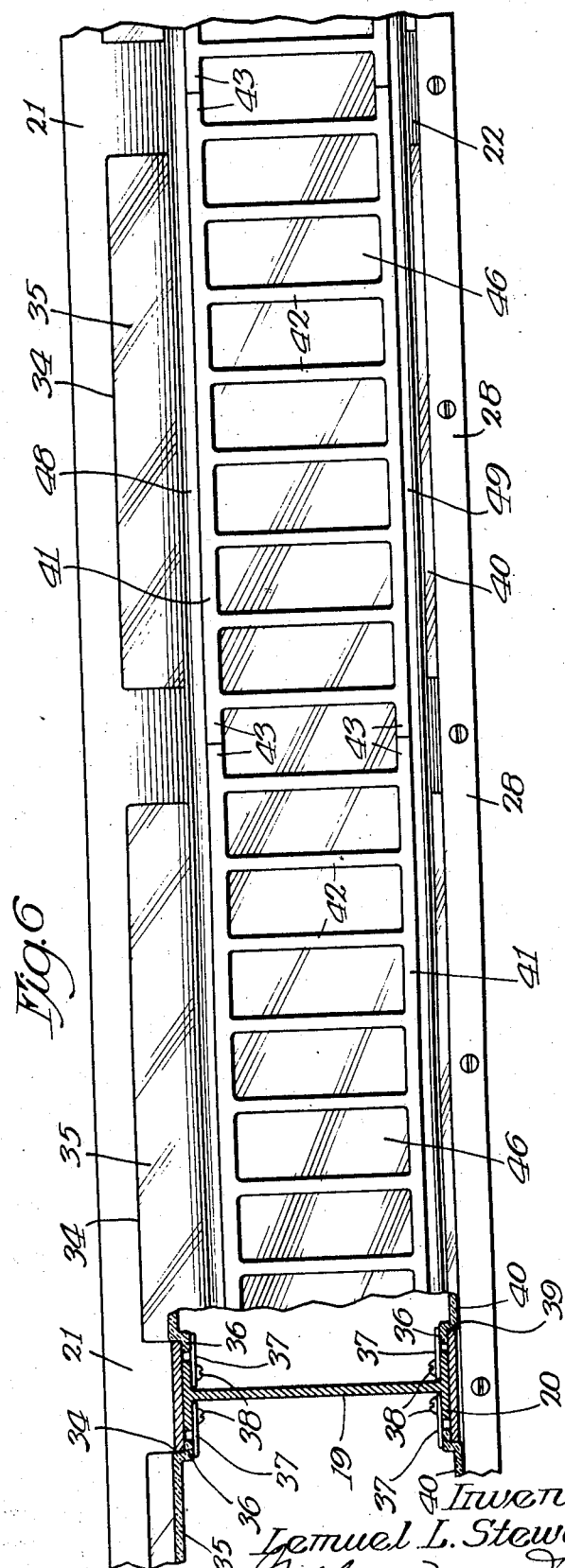
Inventor:
Lemuel L. Stewart Patented Jan. 21, 1941

2,229,145

UNITED STATES PATENT OFFICE 2,229,145

LIGHT FIXTURE

Lemuel L. Stewart, Elkhart, Ind., assignor to The Adlake Company, a corporation of Illinois Application October 30, 1937, Serial No. 171,949

3 Claims. (Cl. 240—7.35)

The principal object of this invention is to provide light fixtures especially adapted for clerestory type cars, that will enable concealed lamps to throw suitable light on the ceiling and walls and give especially good light for passengers in the seats.

Generally speaking, this is accomplished with two overhead fixtures, called troughs, each having an opening at the top for light going to the ceiling, openings at the sides fitted with window panes for diffused light going to the adjacent wall and towards the middle of the car, and a louvered opening at the bottom for relatively intense light on and about the seats. The louvers are made in demountable units that facilitate cleaning and maintenance.

The invention lends itself to many variations suited to different car requirements.

In the embodiment selected for illustration

Fig. 1 is a transverse section through a railroad car, showing the location and general arrangement of the fixtures;

Fig. 2 is a cross section of one of the trough fixtures and an adjacent portion of the car roof;

Fig. 3 is a cross section of the adjacent trough side in Fig. 2, but taken in the area of one of the window panes;

Fig. 4 is a similar cross section of the adjacent trough side in Fig. 2;

Fig. 5 is a vertical section of an intermediate portion of one of the trough fixtures;

Fig. 6 is an inverted plan view looking at the bottom of Fig. 5, and

Fig. 7 is a view similar to Fig. 4, showing a modified form of fastening for the louver unit.

In Fig. 1 there is shown a car 10 of the clerestory type having upper deck 11, side walls 12 of the clerestory, lower decks 13, walls 14, floor 15 and seats 16.

The trough lighting fixtures generally indicated by 17 and 18, are fastened to the inner edge of the lower deck and run from end to end of the area to be lighted.

Each trough comprises a plurality of cross pieces, or brackets 19, here shown as thin web-like castings entirely surrounded by flanges 20 projecting from each side. Such brackets connect two sides 21 at the right and 22 at the left, shown as being made of extruded aluminum or plastic material. The side 21 is made fast to the bracket by screws 23, passing through the flange 20 into thickened portions 24 on the side 21. The side 22 is secured to the brackets 19 by screws 25, extending into thickened portions 26 in the corners of the brackets at the left.

The trough as a whole is secured inside the lower deck by screws 27 passing through the flanges 20 of the brackets 19 and a flange 28 on the left side of the trough.

Lamp sockets 29 (Fig. 5) are mounted on brackets 30 screwed to the inside of the lower deck at 31 and those brackets also support curved reflectors 32. At the upper left corner in Fig. 2 each of the brackets 19 is notched to provide space for a wire conduit 33.

The right side 21 of the trough (Figs. 3 and 6) is provided with elongated openings 34, fitted with window panes 35 (Fig. 6) of glass or molded plastic treated to give the appropriate light diffusion. As will be seen at the left in Fig. 6, each pane has an offset flange 36 secured to the side 21 by clips 37 and screws 38. In like manner the side 22 is provided with similar window openings 39 fitted with similar window panes 40, as shown in Fig. 4.

The open bottom of the trough beneath the lamps is fitted with louver units (Figs. 2 to 6) each comprising side pieces 41, integrally connected with the ends of spaced louvers 42. The side pieces 41 of each unit project beyond the endmost louver 42, as indicated at 43, a distance about half that between adjacent louvers, thereby providing for the proper spacing of end louvers in adjacent units, as shown in the middle of Figs. 5 and 6.

At the upper edge each side piece 41 extends above the louvers, as indicated at 44, and each is provided with a recess 45 which together provide a seat into which is fitted closure or pane 46 of glass or molded plastic treated to give the desired diffusion of light.

The louver units are preferably made of molded plastic material in one piece. They will come from the molds practically finished and of such accurate dimensions that they can be mounted in and demounted from the troughs. For this purpose each side piece 41 is provided with an overhanging shoulder 47, the right of which, in Fig. 2, cooperates with a flange 48 on the side 21 and the left of which cooperates with the flange 49 on a fastening strip 50 secured to the side 22 by screws 51. Gaskets 52 are interposed beneath the shoulders 47 to provide a tight joint and prevent rattling. Above the right side piece 47 the side 21 is provided with curved clips 53, fastened by screws 54.

In the process of assembly the right shoulder 47 is slipped into approximate position with the left shoulder 47 a little below position. The unit is to be rotated upwardly at the left side which brings it into proper position and then the securing strip 50 is screwed into place.

Fig. 7 shows a variation in fastening the left side of the louver unit by screws 55 through the lower edge of the side 22 into the adjacent side of the louver unit. Various other fastenings will readily be devised or selected to suit individual taste. Spring clips will be favored by some, but positive fastening by screws or such like will be demanded by others.

Turning back to Fig. 1, it will be seen that both direct and reflected rays of light will pass out through the opening at the top to illuminate the ceiling of the upper deck and the inside of the side deck walls. Diffused light will pass through the windows 40 and illuminate the ceiling of the lower deck 13 and the side walls 14. Diffused light will pass through the panes 35 towards the middle of the car and generally illuminate the interior. Light directly from the lamp and also from the reflector 32 will pass through the pane 46, when used, and between the louvers down towards the seats and give the necessary illumination in and about the seating area for reading and general purposes.

The panes, when made of glass, will be frosted or enameled to suit the conditions and the lighting required. When made of molded plastic material they will be otherwise treated in a well known manner to the same end. Among the suitable plastic materials are the following:

Phenol-formaldehyde compounds,
Urea-formaldehyde compound,
Methyl-methacrylate resin,
Cellulose acetate.

Whether the plastic is used in natural color or otherwise is a matter of choice for the designer.

It is to be understood, however, that the invention is not limited to the use of louver units made of plastic material. They can be made of a variety of materials. Sheet aluminum and various kinds of iron and steel lend themselves readily to making light louver units and many will prefer to use such materials instead of plastic. It is, however, of great advantage to make the louvers in units instead of each in a separate piece, for by having them in units they can be so much more readily assembled originally and dismounted and reassembled for cleaning and maintenance.

I claim as my invention:

1. In a passenger vehicle having a clerestory type roof with an upper deck and having a lower deck on each side of the clerestory, seats arranged on opposite sides of a central aisle, side walls extending up to the lower decks and windows in the side walls, the combination therewith of a continuous lighting fixture mounted on a lower deck and projecting therefrom directly below the upper deck and comprising a trough-like structure having a light source therein and having a light-transmitting top for sending light from the source upwardly onto the upper deck above the aisle, a light-transmitting rear wall for directing light from the source laterally on to the lower face of the lower deck, a light-transmitting bottom for sending light downwardly onto the seats below, a light-transmitting forward wall for sending light from the source laterally to the area over the aisle, and vertically arranged louvers in the bottom of the structure.

2. In a passenger vehicle having a clerestory type roof with an upper deck, and having a lower deck on each side of the clerestory, seats arranged on opposite sides of a central aisle, side walls extending up to the lower decks and windows in the side walls, the combination therewith of a continuous lighting fixture mounted on a lower deck and projecting therefrom directly below the upper deck and comprising a trough-like structure having a light source therein and having a light-transmitting top for sending light from the source upwardly onto the upper deck above the aisle, a light-transmitting rear wall for directing light from the source laterally onto the lower face of the lower deck, a light-transmitting bottom for sending light downwardly onto the seats below, and a light-transmitting forward wall for sending light from the source laterally to the area over the aisle.

3. In a passenger vehicle having a clerestory type roof with an upper deck, and having a lower deck on each side of the clerestory, seats arranged on opposite sides of a central aisle, side walls extending up to the lower decks and windows in the side walls, the combination therewith of a continuous lighting fixture mounted on a lower deck and projecting therefrom directly below the upper deck and comprising a trough-like structure having a light source therein and having a light-transmitting top for sending light from the source upwardly onto the upper deck above the aisle, a light-transmitting rear wall for directing light from the source laterally onto the lower face of the lower deck, and a light-transmitting bottom face for sending light downwardly onto the seats below.

LEMUEL L. STEWART.